US012590017B2

(12) United States Patent
Ayirala et al.

(10) Patent No.: US 12,590,017 B2
(45) Date of Patent: Mar. 31, 2026

(54) ZERO LIQUID DISCHARGE WATER MANAGEMENT SYSTEM

(71) Applicant: SAUDI ARABIAN OIL COMPANY, Dhahran (SA)

(72) Inventors: Subhash Ayirala, Dhahran (SA); Salah H. Alsaleh, Dhahran (SA); Ali A. Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 463 days.

(21) Appl. No.: 18/150,072

(22) Filed: Jan. 4, 2023

(65) Prior Publication Data

US 2024/0217844 A1 Jul. 4, 2024

(51) Int. Cl.
*C02F 1/26* (2023.01)
*C02F 1/58* (2023.01)
*C02F 103/34* (2006.01)
*C02F 101/32* (2006.01)

(52) U.S. Cl.
CPC ................. *C02F 1/265* (2013.01); *C02F 1/58* (2013.01); *B01D 2221/04* (2013.01); *B01D 2311/252* (2022.08); *C02F 2101/325* (2013.01); *C02F 2101/40* (2013.01); *C02F 2103/34* (2013.01)

(58) Field of Classification Search
CPC ........ B01D 2221/04; C02F 1/24; C02F 1/441; C02F 9/00
See application file for complete search history.

(56) References Cited

U.S. PATENT DOCUMENTS

| | | | |
|---|---|---|---|
| 5,976,366 | A | 11/1999 | Hiwang et al. |
| 9,416,033 | B2 | 8/2016 | Drake |
| 10,308,526 | B2 | 6/2019 | St. John et al. |
| 10,479,928 | B2 | 11/2019 | Ayirala et al. |
| 10,927,309 | B2 | 2/2021 | Koleshwar et al. |
| 2005/0098504 | A1 | 5/2005 | Manz et al. |

(Continued)

FOREIGN PATENT DOCUMENTS

GB          2586594 A  *  3/2021  ................ C02F 1/66

OTHER PUBLICATIONS

Douglas M. Davenport, Akshay Deshmukh, Jay R. Werber, and Menachem Elimelech; High-Pressure Reverse Osmosis for Energy-Efficient Hypersaline Brine Desalination: Current Status, Design Considerations, and Research Needs; Environ. Sci. Technol. Lett. 2018, 5, 467-475.

(Continued)

*Primary Examiner* — Bradley R Spies
(74) *Attorney, Agent, or Firm* — Vorys, Sater, Seymour and Pease LLP

(57) ABSTRACT

Systems and methods including a pretreatment component for pretreating a produced water obtained from a subterranean formation operation to remove at least a portion of dispersed hydrocarbons and hydrogen sulfide therein, thereby producing a high salinity produced water; a desalination component for desalinating of the high salinity produced water to remove at least one or more salts therein, thereby producing a desalinated water and a saturated saline water; and a mineral recovery component for treating the saturated saline water to recover mineral salts therein, thereby producing the recovered mineral salts.

20 Claims, 1 Drawing Sheet

(56) References Cited

U.S. PATENT DOCUMENTS

| | | | | |
|---|---|---|---|---|
| 2014/0042058 A1* | 2/2014 | Janssen | .................... | C09K 8/58 |
| | | | | 208/188 |
| 2014/0151300 A1 | 6/2014 | Savage et al. | | |
| 2015/0083577 A1* | 3/2015 | Govindan | ................ | C02F 9/00 |
| | | | | 210/259 |
| 2015/0315055 A1 | 11/2015 | Chidambaran et al. | | |
| 2020/0115258 A1 | 4/2020 | Trembly et al. | | |
| 2021/0269333 A1* | 9/2021 | Holmstrom | .............. | C02F 1/52 |
| 2022/0010633 A1 | 1/2022 | Posa | | |
| 2022/0242749 A9 | 8/2022 | Sparrow et al. | | |

OTHER PUBLICATIONS

John Walsh, Ramesh Sharma; Fit-for-Purpose Water Treatment in Permian Shale—Field Data, Lab Data and Comprehensive Overview; SPE-191529-MS.

* cited by examiner

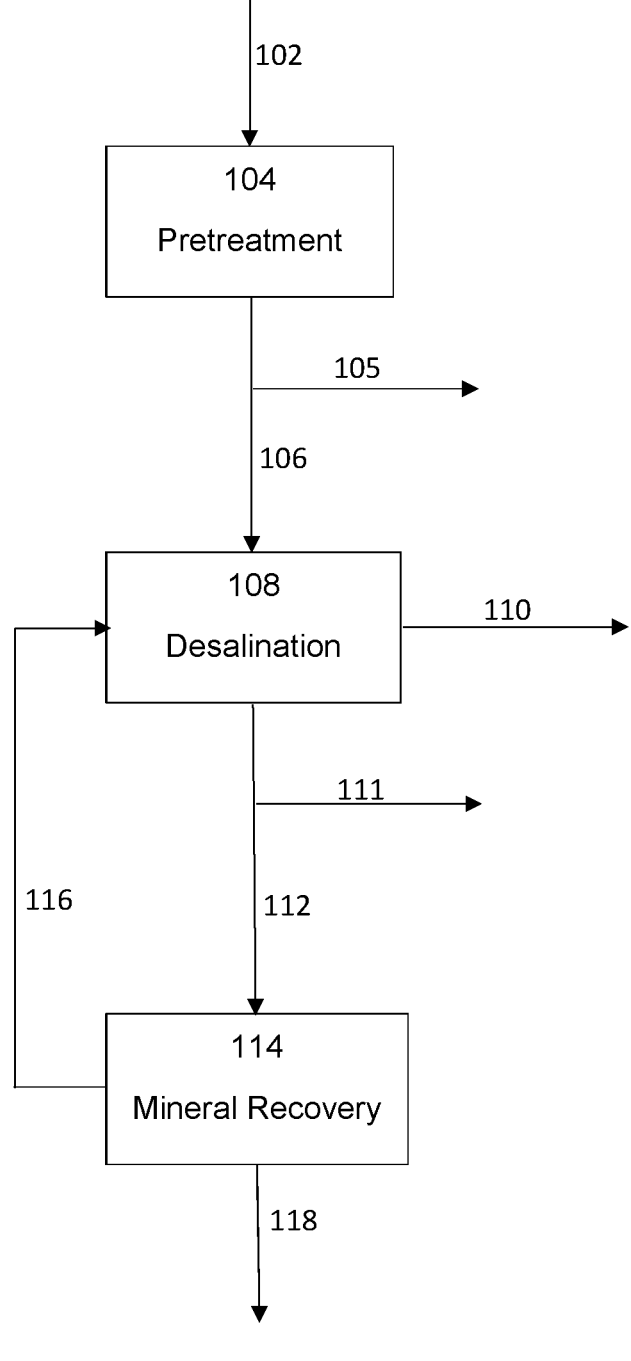

ZERO LIQUID DISCHARGE WATER MANAGEMENT SYSTEM

FIELD OF THE DISCLOSURE

The present disclosure relates generally to the oil and gas industry and, more particularly, to a zero liquid discharge water management system for produced water during hydrocarbon recovery operations.

BACKGROUND OF THE DISCLOSURE

Hydrocarbon recovery operations, such as drilling and stimulation operations, result in the production of large quantities of produced water that flow back to the surface. The amount of produced water worldwide is estimated to be about 220 million barrels per day, equivalent to about three barrels of water for every barrel of oil produced. It is projected that these values will continue to rise significantly over the next decade(s) as offshore and deep-water fields become more mature with time.

Produced water contains various contaminants including, for example, high levels of total dissolved solids, oil and grease, suspended and dissolved solids, dissolved and volatile organic compounds, heavy metals, radionuclides, dissolved gasses, bacteria, and various chemicals used to perform the particular hydrocarbon recovery operation (e.g., biocides, scale and corrosion inhibitors, emulsion breakers, viscosifiers, and the like). Accordingly, produced water is a large volume waste stream that poses a significant hazard if discharged into the environment, and its management, handling, and disposal pose serious practical and economical challenges. There is a need for a method of treating produced water for its recycle/reuse that is sustainable, economically viable, and environmentally friendly.

With respect to the aforementioned considerations, the present disclosure provides a zero liquid discharge produced water management system and method that promotes circular water economy, sustainability, and environmental preservation.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A system comprising: a pretreatment unit for pretreating a produced water obtained from a subterranean formation operation; wherein the produced water contains dispersed hydrocarbons, hydrogen sulfide, or both, and wherein the pretreatment unit removes at least a portion of the dispersed hydrocarbons, hydrogen sulfide, or both, thereby producing a high salinity water; a desalination unit for desalinating the high salinity water to remove at least one or more salts therein, thereby producing a desalinated water and a saturated saline water; and a mineral recovery component for treating the saturated saline water to recover mineral salts therein, thereby producing recovered salt.

A method comprising: pretreating a produced water obtained from a subterranean formation operation to remove at least a portion of dispersed hydrocarbons and hydrogen sulfide therein, thereby producing a high salinity water; desalinating the high salinity water to remove at least one or more salts therein, thereby producing a desalinated water and a saturated saline water; treating the saturated saline water to recover mineral salts therein, thereby producing recovered mineral salts.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIGURE is a flowchart of the ZLD produced water management system of the present disclosure.

DETAILED DESCRIPTION

Embodiments of the present disclosure will now be described in detail with reference to the accompanying FIGURES. Like elements in the various FIGURES may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying FIGURES may vary without departing from the scope of the present disclosure.

The present disclosure relates generally to the oil and gas industry and, more particularly, to a zero liquid discharge water management system for produced water during hydrocarbon recovery operations, and methods related thereto.

The present disclosure provides a zero liquid discharge (ZLD) produced water management system and method to achieve 100% circular water economy. The ZLD produced water management system of the present disclosure comprises generally a pretreatment component, desalination component, and mineral recovery component to desalinate oil and gas produced water by transforming its ionic properties. The system provides the flexibility to generate different water streams, including both high salinity and low salinity water streams that can be used for various upstream applications. Further, concentrated salts obtained as part of the system can be either reutilized or processed further for hydrocarbon recovery operations.

The ZLD produced water management system described herein promotes environmental sustainability by, without limitation, saving energy and water resources due to the avoidance of produced water (wastewater) disposal, avoidance of seawater desalination, reduction of groundwater consumption; and promotion of 100% circular water economy. Moreover, the ZLD produced water management system is economically viable and even beneficial by, without limitation, avoiding produced water disposal (e.g., storing, transporting, treating, and the like) and generating revenue from fresh water and mineral (salt) recovery.

Definitions

As used herein, the term "subterranean formation," and grammatical variants thereof, refers to any conventional or unconventional body of rock beneath the Earth's surface, including subsea surfaces. Such subterranean formations may include sandstone, shale, and the like.

As used herein, the term "produced water," and grammatical variants thereof, refers to water produced from a subterranean formation well that is not a treatment fluid. Produced water may be brought to the surface during various subterranean formation operations, such as drilling operations, fracturing operations, and completion operations.

The term "subterranean formation operation," and grammatical variants thereof, refers to any operation performed in a subterranean formation in the oil and gas industry such as, for example, drilling, fracturing, completion operations, waterflooding operations, conformance operations, pressure maintenance operations, and the like.

The terms "zero liquid discharge" and "ZLD," and grammatical variants thereof, as used herein, refers to produced water that is either recycled or evaporated, leaving zero liquid waste to be discharged. As used herein, the term encompasses 100% ZLD and near-ZLD that is less than 100% but no more than 90%.

As used herein, the term "circular water economy," and grammatical variants thereof, refers to an economic framework for reducing, preserving, and optimizing the use of water through the use of waste avoidance, efficient utilization, and quality retention while preserving environmental protection and conservation. The term "100% circular water economy," as used herein, refers to a system in which no produced water is wasted.

ZLD Produced Water Management System

Referring to the FIGURE, illustrated is the ZLD produced water management system 100 of the present disclosure. Briefly, the ZLD system 100 comprises three major components, described in greater detail below: a pretreatment unit 104 to remove dispersed hydrocarbons (oil) and hydrogen sulfide from produced water 102, a desalination unit 108 to remove salts from the high salinity water 106 after pretreatment 104, and a mineral recovery unit 114 to remove salts from the produced water. The ZLD system 100 transforms the ionic properties of produced water 102 and can achieve 100% circular water economy.

The ZLD system 100 is designed to treat and recover useful substances from produced water. Oilfield operations create vast quantities of produced water along with the desired hydrocarbons. One of the first steps in treatment of hydrocarbons retrieved from subterranean formations is to separate the hydrocarbons from the produced water. Generally this occurs in a water-oil separation unit. When that separation occurs, the resulting produced water is not pure water, instead it often includes a high level of total dissolved solids (TDS), that is salts and minerals that are water-soluble, as well as some retained hydrocarbons and, often, hydrogen sulfide ($H_2S$). By way of example, produced water generally has from 50,000 ppm to 250,000 ppm of TDS, encompassing any value and subset therebetween, such as in the range of about 50,000 ppm TDS to about 100,000 ppm TDS, or about 100,000 TDS to about 200,000 TDS, or about 75,000 ppm TDS to about 150,000 ppm TDS. The produced water 102 may also include dispersed hydrocarbons in the range of about 100 ppm to about 200 ppm, encompassing any value and subset therebetween, such as in the range of about 100 ppm to about 150 ppm, or about 150 ppm to about 200 ppm, or about 125 ppm to about 175 ppm. The produced water 102 may additionally include dissolved hydrogen sulfide in the range of about 200 ppm to about 500 ppm, encompassing any value and subset therebetween, such as in the range of about 200 ppm to about 300 ppm, or about 200 ppm to about 400 ppm, or about 300 ppm to about 400 ppm, or about 400 ppm to about 500 ppm. In order to achieve ZLD, it is necessary to purify the water to remove undesirable TDS, $H_2S$, and retained hydrocarbons.

As shown in the FIGURE, produced water 102 is first sent to pretreatment unit 104. The pretreatment unit 104 of ZLD system 100 is used to remove dispersed hydrocarbons and hydrogen sulfide from the produced water 102, which is hypersaline in nature. The pretreatment unit 104 utilizes at least one or more technologies to remove hydrocarbons and/or hydrogen sulfide, including ceramic ultrafiltration membrane technology, dissolved gas floatation (DGF), induced gas floatation (IGF) technology (e.g., using air or $N_2$ gas), centrifuge technology, and/or deoiler hydrocyclone technology. These technologies are used in combination with demulsifying and/or hydrogen sulfide scavenging chemicals. Suitable demulsifying chemicals may include, but are not limited to, dodecylbenzylsulfonic acid (DDBSA), the sodium salt of xylenesulfonic acid (NAXSA), epoxylated and propoxylated compounds, anionic cationic and nonionic surfactants, resins such as phenolic and epoxide resins, and any combination thereof. Suitable hydrogen sulfide scavengers include, but are not limited to, oxidants (e.g., inorganic peroxides, such as sodium peroxide or chlorine dioxide); aldehydes (e.g., aldehydes having 1-10 carbons, such as formaldehyde or glutaraldehyde or (meth) acrolein); triazines (e.g., monoethanol amine triazine, monomethylamine triazine, or triazines from multiple amines or mixtures thereof); glyoxal; and any combination thereof.

In one or more aspects of the present disclosure, the pretreatment unit 104 can reduce the dispersed hydrocarbon content of the produced water 102 to less than about 10 ppm (including 0 ppm) and the dissolved hydrogen sulfide content of the produced water 102 to less than about 1 ppm (including 0 ppm). Exiting the pretreatment unit 104 is high salinity water 106 that is substantially free of dispersed hydrocarbons and dissolved hydrogen sulfide. If desired, the high salinity water 106 may be directly reused as removed high salinity water 105 for injection within a subterranean formation to perform one or more subterranean formation operations, such as injection into a well for pressure maintenance or injection into a well for waterflooding, among other subterranean formation operations. Moreover, if the removed high salinity water 105 is reused in a subterranean formation operation, it may be blended with other fluids (i.e., aqueous or hydrocarbon-based) and/or appropriate additives for the given operation, without departing from the scope of the present disclosure.

The high salinity water 106 that is not reused, and with continued reference to the FIGURE, is next processed in the desalination unit 108 of the ZLD system 100. The desalination unit 108 includes one or more technologies such as, but not limited to, dynamic vapor compression technology, carrier gas extraction technology, and/or a high pressure reverse osmosis technology. Dynamic vapor compression technology is based on the evaporation of water, followed by condensation of water vapor to generate fresh water. Carrier gas extraction technology utilizes a carrier gas, such as air, to extract fresh water from hypersaline water (e.g., the high salinity water 106) based on humidification-dehumidification principles. High pressure reverse osmosis technology relies on reverse osmosis at high hydraulic pressures to efficiently desalinate the hypersaline water (e.g., the high salinity water 106).

The desalinated water 110 product from the desalination unit 108 is a low salinity fresh water (less than 100-500 ppm TDS) that can be used in various oil and gas subterranean formation operations, as described below, and including upstream operations such as drilling, fracturing, and completion operations, among others. In addition to the desalinated water 110, the desalination unit 108 further produces saturated saline water 112.

In some embodiments, the saturated saline water exiting the desalination unit 110 can be removed from the ZLD system 100 as removed saturated saline water 111 and used directly to formulate aqueous-based or hydrocarbon-based fluids for subterranean formation operations (e.g., drilling operations) similar to the use of removed high salinity water 105, with the understanding that removed saturated saline water 111 has a much higher TDS than removed high salinity water 105.

The saturated saline water 112 may be processed in the mineral recovery unit 114 of the ZLD system 100 to separate and concentrate salts from the saturated saline water 112 and produce recovered salt 118, generally NaCl salt. The mineral recovery unit 114 may include at least one, and potentially more, technologies such as, but not limited to, evaporation technology, decanter technology (e.g., decanter centrifuge technology) and/or filter press technology. The concentrated salts obtained from the mineral recovery unit 114 can be separated and dried to generate high purity salts.

Generally, at least a portion of the saturated saline water 112 can also be continuously recycled 116 (e.g., manually or via a recycling conduit forming part of the ZLD system 100, such as tubing or piping) within the ZLD system 100 to mix with the high salinity water 106 after processing by the pretreatment unit 104 to achieve ZLD (or near-ZLD).

In one or more aspects, the desalination unit 108 may be integrated with renewable energy resources, such as one or more solar energy panels, geothermal energy, and a combination thereof. Such renewable energy resources can be utilized to meet certain energy requirements of the ZLD system 100 and reduce its carbon footprint and lower greenhouse gas emissions.

As described above, the ZLD system 100 of the present disclosure can lower the salinity of produced water exhibiting the high salinity value in the range of about 50,000 ppm TDS to about 250,000 ppm TDS to values in the range of about 100 ppm TDS to about 500 ppm TDS or lower, essentially generating fresh water. And once processed through the mineral recovery unit 114, recovered salt 118 is also produced. The desalinated water 110 is optimally suited for reuse in a variety applications to promote circular water economy. Such applications include, but are not limited to, (1) Waterflooding: for subterranean reservoir injection of tight formations to mitigate scaling and reservoir scouring; (2) Improved/Enhanced Oil Recovery (IOR/EOR): as injection water for IOR/EOR processes, such as "smart water" flooding, polymer flooding, surfactant-polymer flooding, and the like to increase hydrocarbon recovery; (3) Conformance Control: as water for nanosilica-based gels and conventional polymer-crosslinked gels for conformance control; (4) Feed Water for Steam Boilers: for generation of steam; (5) Unconventional Fracturing: optimal low salinity water for fracturing operations in unconventional subterranean formations to generate or increase hydrocarbon production; (6) Crude Oil Desalting: as wash water from crude oil desalting to avoid negative effects during downstream refining, such as corrosion, scale formation, catalyst deactivation, and the like; (7) Irrigation/Agriculture: as a water resource for plantation and irrigation to indirectly lower carbon emissions into the environment.

It is to be understood that, as needed, the low salinity water produced from the system 100 described herein may further be mixed with other waters (e.g., higher salinity water) and/or other fluids, additives, or chemicals to tailor it to a particular need/operation/application, without departing from the scope of the present disclosure.

Accordingly and advantageously, the ZLD system 100 accordingly affords high versatility for the recycle and reuse of produced water otherwise considered a contaminated wastewater, and further demonstrates 100% circular water economy due to zero or near-zero waste discharge into the environment, thus promoting environmental sustainability. Indeed, 100% circular water economy is achieved, for example, using the system 100 described herein by enabling the recycle and reuse of produced water in various upstream subterranean formation operations and other operations (e.g., steam generation), as described above. Environmental sustainability is promoted by use of the system 100 of the present disclosure, conserving ground water and injection seawater, while avoiding produced water disposal.

Accordingly, the present disclosure further comprises a method for utilizing system 100 comprising pretreating a produced water obtained from a subterranean formation operation, such as from a drilling operation, a fracturing operation, and/or a completion operation. The pretreatment removes dispersed hydrocarbons and hydrogen sulfide and may be performed by any of the aforementioned pretreatment technologies provided above with reference to the system 100, including ceramic ultrafiltration membrane technology, dissolved gas floatation, induced gas floatation technology (e.g., using air or $N_2$ gas), centrifuge technology, or deoiler hydrocyclone technology. The resultant product is high salinity produced water. The high salinity produced water is thereafter desalinated to remove salts by means of any of the aforementioned desalination technologies provided above with reference to the system 100, including dynamic vapor compression technology, carrier gas extraction technology, or a high pressure reverse osmosis technology. Desalination of the high salinity produced water produces a desalinated water and a saturated saline water. The desalinated water may be used in one or more upstream subterranean formation operations, including those described above. The saturated saline water may be further processed for mineral (salt) recovery. Mineral (salt) recovery may be performed using any of the aforementioned mineral separation and recovery technologies, including evaporator technology, decanter technology (e.g., decanter centrifuge technology) or filter press technology. A portion of the saturated saline water may be recycled and included with a stream of high saline produced water (after pretreatment) to again be desalinated therewith.

Embodiments disclosed herein include:

Embodiment A: A system comprising: a pretreatment unit for pretreating a produced water obtained from a subterranean formation operation; wherein the produced water contains dispersed hydrocarbons, hydrogen sulfide, or both, and wherein the pretreatment unit removes at least a portion of the dispersed hydrocarbons, hydrogen sulfide, or both, thereby producing a high salinity water; a desalination unit for desalinating the high salinity water to remove at least one or more salts therein, thereby producing a desalinated water and a saturated saline water; and a mineral recovery component for treating the saturated saline water to recover mineral salts therein, thereby producing recovered salt Embodiment B: A method comprising: pretreating a produced water obtained from a subterranean formation operation to remove at least a portion of dispersed hydrocarbons and hydrogen sulfide therein, thereby producing a high salinity water; desalinating the high salinity water to remove at least one or more salts therein, thereby producing a desalinated water and a saturated saline water; treating the saturated saline water to recover mineral salts therein, thereby producing recovered mineral salts.

Embodiment A may have one or more of the following additional elements in any combination:

Element A1: wherein the subterranean formation operation selected from the group consisting of a drilling operation, a fracturing operation, a completion operation, and any combination thereof.

Element A2: wherein the produced water has a salinity in the range of about 50,000 parts per million of total dissolved solids to about 250,000 parts per million of total dissolved solids.

Element A3: wherein the produced water has a dissolved hydrocarbon content in the range of about 100 parts per million to about 200 parts per million.

Element A4: wherein the pretreatment unit comprises a technology selected from the group consisting of ceramic ultrafiltration membrane technology, dissolved gas floatation, induced gas floatation technology, centrifuge technology, deoiler hydrocyclone technology, and any combination thereof.

Element A5: wherein the pretreatment unit technology further comprises inclusion of one or both of a demulsifying chemical or a hydrogen sulfide scavenging chemical.

Element A6: wherein the demulsifying chemical is selected from the group consisting of dodecylbenzylsulfonic acid, the sodium salt of xylenesulfonic acid, an epoxylated compound, a propoxylated compound, an anionic surfactant, a cationic surfactant, a nonionic surfactant, a resin, and any combination thereof.

Element A7: wherein the hydrogen sulfide scavenging chemical is selected from the group consisting of an oxidant, an aldehyde, a triazine, glyoxal, and any combination thereof.

Element A8: wherein the desalination unit comprises a technology selected from the group consisting of dynamic vapor compression technology, carrier gas extraction technology, a high pressure reverse osmosis technology, and any combination thereof.

Element A9: wherein the mineral recovery component comprises a technology selected from the group consisting of evaporator technology, decanter technology, filter press technology, separation technology, drying technology and any combination thereof.

By way of non-limiting example, exemplary combinations applicable to Embodiment A include: Elements A4, A5, A6; Elements A4, A5, A6, A7; Elements A1 and A2; Elements A1 and A3; Elements A8 and A9.

Embodiment B may have one or more of the following additional elements in any combination:

Element B1: wherein the subterranean formation operation selected from the group consisting of a drilling operation, a fracturing operation, a completion operation, and any combination thereof.

Element B2: wherein the produced water has a salinity in the range of about 50,000 parts per million of total dissolved solids to about 250,000 parts per million of total dissolved solids.

Element B3: wherein the produced water has a dissolved hydrocarbon content in the range of about 100 parts per million to about 200 parts per million.

Element B4: wherein the pretreatment component comprises a technology selected from the group consisting of ceramic ultrafiltration membrane technology, dissolved gas floatation technology, induced gas floatation technology, centrifuge technology, deoiler hydrocyclone technology, and any combination thereof.

Element B5: wherein the pretreatment component technology further comprises inclusion of one or both of a demulsifying chemical or a hydrogen sulfide scavenging chemical.

Element B6: wherein the demulsifying chemical is selected from the group consisting of dodecylbenzylsulfonic acid, the sodium salt of xylenesulfonic acid, an epoxylated compound, a propoxylated compound, an anionic surfactant, a cationic surfactant, a nonionic surfactant, a resin, and any combination thereof.

Element B7: wherein the hydrogen sulfide scavenging chemical is selected from the group consisting of an oxidant, an aldehyde, a triazine, glyoxal, and any combination thereof.

Element B8: wherein the desalination component comprises a technology selected from the group consisting of dynamic vapor compression technology, carrier gas extraction technology, a high pressure reverse osmosis technology, and any combination thereof.

Element B9: wherein the mineral recovery component comprises a technology selected from the group consisting of evaporator technology, decanter technology, filter press technology, separation technology, drying technology and any combination thereof By way of non-limiting example, exemplary combinations applicable to Embodiment b include: Elements B2, B3; Elements B4, B5, B6; Elements B4, B5, B6, B7; Elements B1 and B2; Elements B1 and B3; Elements B8 and B9.

To facilitate a better understanding of the embodiments described herein, the following examples of various representative embodiments are given. In no way should the following examples be read to limit, or to define, the scope of the present disclosure.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached"

or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system comprising:
a pretreatment unit for pretreating a produced water obtained from a subterranean formation operation;
wherein the produced water contains dispersed hydrocarbons, hydrogen sulfide, or both, and
wherein the pretreatment unit removes at least a portion of the dispersed hydrocarbons, hydrogen sulfide, or both, thereby producing a high salinity water;
a desalination unit for desalinating the high salinity water to remove at least one or more salts therein, thereby producing a desalinated water and a saturated saline water;
a recycling conduit configured to return at least a portion of the saturated saline water to a location downstream of the pretreatment unit and upstream of the desalination unit to mix with the high salinity water before entering the desalination unit to remove one or more salts therein; and
a mineral recovery component for treating the saturated saline water to recover mineral salts therein, thereby producing recovered salt.

2. The system of claim 1, wherein the subterranean formation operation is selected from the group consisting of a drilling operation, a fracturing operation, a completion operation, and any combination thereof.

3. The system of claim 1, wherein the produced water has a salinity in the range of about 50,000 parts per million of total dissolved solids to about 250,000 parts per million of total dissolved solids.

4. The system of claim 1, wherein the produced water has a dissolved hydrocarbon content in the range of about 100 parts per million to about 200 parts per million.

5. The system of claim 1, wherein the pretreatment unit comprises a pretreatment unit technology selected from the group consisting of ceramic ultrafiltration membrane technology, dissolved gas floatation, induced gas floatation technology, centrifuge technology, and any combination thereof.

6. The system of claim 5, wherein the pretreatment unit technology further comprises inclusion of one or both of a demulsifying chemical or a hydrogen sulfide scavenging chemical.

7. The system of claim 6, wherein the demulsifying chemical is selected from the group consisting of dodecylbenzylsulfonic acid, the sodium salt of xylenesulfonic acid, an epoxylated compound, a propoxylated compound, an anionic surfactant, a cationic surfactant, a nonionic surfactant, a resin, and any combination thereof.

8. The system of claim 6, wherein the hydrogen sulfide scavenging chemical is selected from the group consisting of an oxidant, an aldehyde, a triazine, glyoxal, and any combination thereof.

9. The system of claim 1, wherein the desalination unit comprises a technology selected from the group consisting of dynamic vapor compression technology, carrier gas extraction technology, a high pressure reverse osmosis technology, and any combination thereof.

10. The system of claim 1, wherein the mineral recovery component comprises a technology selected from the group consisting of evaporator technology, decanter technology, filter press technology, separation technology, drying technology and any combination thereof.

11. A method comprising:
pretreating a produced water obtained from a subterranean formation operation to remove at least a portion of dispersed hydrocarbons and hydrogen sulfide therein, thereby producing a high salinity water;
desalinating the high salinity water in a desalination unit to remove at least one or more salts therein, thereby producing a desalinated water and a saturated saline water;
returning at least a portion of the saturated saline water via a recycling conduit to a location upstream of the desalination unit to mix with the high salinity water before entering the desalination unit to remove one or more salts therein; and
treating the saturated saline water to recover mineral salts therein, thereby producing recovered mineral salts.

12. The method of claim 11, wherein the subterranean formation operation is selected from the group consisting of a drilling operation, a fracturing operation, a completion operation, and any combination thereof.

13. The method of claim 11, wherein the pretreatment component comprises a pretreatment unit technology selected from the group consisting of ceramic ultrafiltration membrane technology, dissolved gas floatation technology, induced gas floatation technology, centrifuge technology, and any combination thereof.

14. The method of claim 13, wherein the pretreatment unit technology further comprises inclusion of one or both of a demulsifying chemical or a hydrogen sulfide scavenging chemical, and wherein the pretreatment unit technology removes at least a portion of the hydrogen sulfide independently of the hydrogen sulfide scavenging chemical if present.

15. The method of claim 14, wherein the demulsifying chemical is selected from the group consisting of dodecylbenzylsulfonic acid, the sodium salt of xylenesulfonic acid, an epoxylated compound, a propoxylated compound, an anionic surfactant, a cationic surfactant, a nonionic surfactant, a resin, and any combination thereof.

16. The method of claim 14, wherein the hydrogen sulfide scavenging chemical is selected from the group consisting of an oxidant, an aldehyde, a triazine, glyoxal, and any combination thereof.

17. The method of claim 11, wherein the desalination component comprises a technology selected from the group consisting of dynamic vapor compression technology, carrier gas extraction technology, a high pressure reverse osmosis technology, and any combination thereof.

18. The method of claim 11, wherein the mineral recovery component comprises a technology selected from the group consisting of evaporator technology, decanter technology, filter press technology, separation technology, drying technology and any combination thereof.

19. The system of claim 6, wherein the pretreatment unit technology removes at least a portion of the hydrogen sulfide independently of the hydrogen sulfide scavenging chemical if present.

20. The system of claim 1, wherein the pretreatment unit comprises deoiler hydrocyclone technology.

* * * * *